Patented May 30, 1950

2,509,260

UNITED STATES PATENT OFFICE 2,509,260

METHOD OF FILTRATION

Michael Carosella, Niagara Falls, N. Y., assignor to United States Vanadium Corporation, a corporation of Delaware No Drawing. Application April 19, 1946, Serial No. 663,643

1 Claim. (Cl. 210—62)

The invention relates to an improved method of filtration, and more particularly to the filtration of sand-slime mineral pulp from an alkaline aqueous medium.

Certain ores, particularly elastic or sedimentary types, are composed of fragments or sand particles, united by cementitious material. Upon comminution of such ore, as in dressing operations, a large quantity of the cementitious material is reduced to a pulverulent state effectively stripping it from the sand particles. The addition of water to the comminuted mass forms a slime of the pulverulent cementitious material, and upon still further addition of water, the slime takes on the characteristics of a colloidal dispersion.

The coexistence of sand and slime impedes filtration procedures. In conventional gravity filtration the sand settles rapidly and the more slowly settling slime forms a compact layer on the upper surface of the settled sand thereby hindering further fluid passage. In operations employing commercial filters of the disc or drum type, the settled sand impedes or halts motion of the filter sector and, as the supernatant liquid is drawn off, the suspended slimes clog the filter pores rendering continued filtration difficult or impossible.

It is known that particles in colloidal dispersion possess an electric charge, either positive or negative, and that by treatment with certain electrolytes the charge may be neutralized and the particles coagulated and precipitated. In filtration operations, particularly in the washing stage, as the electrolyte is leached from the precipitated solid phase, peptization may occur with the result that the precipitate reverts to its original colloidal condition, and either passes through or clogs the filter pores.

It is an object of the invention to provide a means for flocculating or coagulating slimes or other colloidally dispersed material in an alkaline aqueous medium to obtain a precipitate amenable to conventional filtration operations.

Another object is to lower the pulp density threshold at which settling of the sand-slime mixture occurs.

A further object is to maintain a uniform distribution of sand and flocculated slimes throughout the filtering operation, thereby increasing the permeability of the resulting filter cake and, in addition, enabling relatively free and uninterrupted movement of the sector of a continuous filter.

The present invention is based upon the discovery that the aforecited objects may be attained by the addition of a small amount of an appropriate amine to a sand-slime mineral pulp in an alkaline aqueous medium. Appropriate amines comprise glyoxalidines having a substituent in the 2-position which is a member of the group consisting of higher alkyl and alkenyl radicals. Amines, particularly suitable for use with the invention, are described in U. S. Patent 2,267,965 entitled "Hydroxyalkyl glyoxalidines" and U. S. Patent 2,355,837 entitled "Substituted glyoxalidines" both issued to A. L. Wilson.

Hydroxyalkyl glyoxalidines comprise glyoxalidines having a substituent in the 2-position which is a member of the group consisting of higher alkyl and alkenyl radicals and having a hydroxyalkyl group substituent in the 1-position. An example is 1-hydroxyethyl-2-heptadecenyl glyoxalidine (or imidizol-1 ethanol-2 heptadecene 8) which compound is among those used to illustrate the invention.

Substitued glyoxalidines comprise glyoxalidines having a substituent in the 2-position which is a member of the group consisting of the higher alkyl and alkenyl radicals and having a substituent in the 1-position containing an amino group. Examples are 1-aminoethyl-2-heptadecenyl glyoxalidine (or imidizol-1 ethylamine-2 heptadecene 8) and 1-(aminoethyl diiminoethylene) 2-heptadecenyl glyoxalidine (or imidizol-1 ethyl amido ethyl amido ethyl amine-2 heptadecene 8) which compounds are among those used to illustrate the invention.

Data from tests illustrating the effectiveness of the invention are given in Table I. The tests show the relative buoyancy imparted to the slimes by the amines, the term "buoyancy" referring to the apparent property of the flocculated slimes to support the sand particles and maintain them in uniform dispersion in the alkaline aqueous medium. Comparative filtration times and the condition of the resulting filter cake are also shown.

In each of these tests a ten kilogram sample of raw ore of the sand-slime character was digested with 60 grams of sodium carbonate in 5.4 kg. of water for one hour at a temperature of 113° C. and under a steam pressure of 0.70 kg. per sq. cm. (10 lbs. per sq. in.). The digested pulp was then diluted to 50% solids and a 200 gram sample (dry ore basis) removed for test. Each sample was treated with a 1% solution of the hydrochloride of the indicated amine in an amount equal to two pounds per ton (2000 pounds) of ore on a dry solid basis. The treated pulp was then filtered on a Buchner funnel.

increased, but notwithstanding this increase, was considerably below the average washing rate in

*Table I*

| Example No. | Amine Added [1] | Buoyancy | Filtering Time, Min. | Cake Conditions |
|---|---|---|---|---|
| 1 | None | Poor | 4.00 | Segregated. |
| 2 | Imidizol-1 ethanol-2 Heptadecene 8 | Fair | 3.00 | Fair. |
| 3 | Imidizol-1 ethylamine-2 Heptadecene 8 | Good | 2.75 | Good. |
| 4 | Imidizol-1 ethyl amido ethyl amido ethyl amine-2 heptadecene 8. | Best | | Do. |
| 5 | Diethylaminoethyl laurate | Poor | 5.00 | Segregated. |

[1] As 1% solution of the hydrochloride of the amine. Ratio of quantity of amine to material being treated (dry solid equivalent) was 1:1000.

In the table, Example 1 had no amine treatment, Example 5 was treated with an amine not in the class employed in the invention, and Examples 2, 3 and 4 were treated in accordance with the invention with glyoxalidines having a substituent in the 2-position which is a member of the group consisting of higher alkyl and alkenyl radicals. In Examples 1 and 5, buoyancy was poor and the filter cakes segregated; whereas in Examples 2, 3 and 4, made according to the invention, the buoyancy was entirely satisfactory and the filter cakes were uniform and porous. In addition, the filtering time in Examples 2, 3 and 4 was considerably faster than in Examples 1 and 5.

Diethylaminoethyl laurate used in Example 5, is unsatisfactory as a filter aid in the treatment of sand-slime pulp in an alkaline aqueous medium. However, this amine and others of the class comprising tertiary amino alcohols and their fatty acid esters are most satisfactory as filter aids in the treatment of sand-slime pulp in neutral or slightly acid solutions and such treatment with these amines is the subject of another invention disclosed in a copending application Serial No. 663,644.

The present invention has particular efficacy in converting pulp, which from practical considerations, is substantially unfilterable and unwashable, to a condition readily amenable to filtration treatments. This is demonstrated by examples, the data of which are contained in Table II. In each example a quantity of pulp from a soda ash digestion of vanadium ore was adjusted to 50% solids by the addition of water containing the indicated amine, and then filtered on a Buchner funnel. The pulp, after filtration, containing about 80% solids, was washed by displacement with water until free from soluble material.

Examples 3 and 4 which were treated with amines according to the invention.

Often desirable mineral values dissolved in the aqueous medium associated with a sand-slime pulp. To recover these values by filtration requires a uniform suspension of sand and slime. Such a suspension is difficult to maintain as dilution leads to rapid segregation of the sand. For example, a digested pulp of the sand-slime type was adjusted to 75% solids at which concentration the pulp remained in uniform suspension in the aqueous medium. Dilution to 50% solids, however, led to a rapid segregation of sands, thus increasing the difficulties of filtration operations. Treatment of this same pulp with an amine, according to the invention, made possible dilution to 50% or less solids without disturbing in any way the uniform quality of the sand-slime suspension.

The ability to lower the settling threshold of sand-slime pulp and maintain a uniform suspension at lower pulp concentrations, made possible by the invention, has definite economic value. For example, with a pulp containing 50% solids, a recovery of 97% of the soluble mineral values was accomplished in four repulpings, whereas with a pulp containing 75% solids, seven repulpings were necessary to effect the same recovery.

It is to be understood that the invention is not limited to or by the compositions of the sand-slime materials set forth in this specification, but is applicable to the treatment of a number of other materials of like character wherein the particle size may range from colloidal dimensions to the dimensions of common sand. It is also to be understood that the term "amine" as used in this application includes salts of the amine, as for example, the hydrochloride, sulphate, or acetate of the amine, in fact when the water solubility of the amine salt is greater than that of

*Table II*

| Example No. | Amine Added | Comparative [1] Settling Value | Filtration rate in cc./min. | Av. washing rate in cc./min. |
|---|---|---|---|---|
| 1 | None | 24 | 25.0 | 1.5 |
| 2 | None—washings with 3% sodium carbonate solution | 27 | 23.5 | 4.8 |
| 3 | Imidizol-1 ethanol-2 heptadecene 8 3 lbs./ton | 68 | 61.0 | 8.1 |
| 4 | Imidizol-1 ethylamine-2 heptadecene 8 1 lb./ton | 62 | 52.5 | 8.6 |

[1] Volume of clear liquor in centimeters after 15 min. settling time.

In the table, Examples 3 and 4, made according to the invention, had settling values and filtration rates over 100% greater than either Examples 1 or 2 in which no amine was used. The average washing rate in Example 1 was extremely low due, probably, to loss of electrolyte (soda ash) in the washing procedure. In Example 2, wherein electrolyte was introduced with the washing water, the average washing rate was the amine the salt may be preferred. The invention has a wide range of applicability in the filtration art and is not to be construed as limited to the examples given or their specific mode of operation. For example, the ratio of quantity of amine to material being treated (dry solid equivalent) was 1:1000 in the cited examples. This is not to be construed as a necessary lower limit. The quantity of amine to be used depends to a large extent on the nature of the sand-slime pulp and with many mineral pulps of this character a smaller quantity of amine may be effective in improving filtration rates.

What is claimed is:

Method of preventing the formation of a segregated impervious layer of pulverant cementitious material when filter washing a sand-slime mineral pulp in an alkaline aqueous medium, comprising adding to said aqueous medium a glyoxalidine having a substituent in the 2-position which is a member of the group consisting of higher alkyl and alkenyl radicals in an amount equal to about two pounds of said glyoxalidine to each ton (2000 pounds), dry solid basis, of solids present in said aqueous medium; agitating said aqueous medium until a uniform suspension of sand and slime is produced; withdrawing a portion of said aqueous medium to produce a permeable mass of uniformly intermixed sand and slime; and thereafter filter-washing said permeable mass of sand and slime to remove soluble material therefrom.

MICHAEL CAROSELLA.

REFERENCES CITED

The following references are of record in the file of this patent:

UNITED STATES PATENTS

| Number | Name | Date |
|---|---|---|
| 2,267,965 | Wilson | Dec. 30, 1941 |
| 2,343,221 | Maust et al. | Feb. 29, 1944 |
| 2,358,055 | Cahn | Sept. 12, 1944 |
| 2,364,272 | Christmann et al. | Dec. 5, 1944 |
| 2,374,354 | Kaplan | Apr. 24, 1945 |